US008972265B1

(12) United States Patent
Lester

(10) Patent No.: US 8,972,265 B1
(45) Date of Patent: Mar. 3, 2015

(54) MULTIPLE VOICES IN AUDIO CONTENT

(75) Inventor: Kevin S. Lester, New York, NY (US)

(73) Assignee: Audible, Inc., Newark, NJ (US)

( * ) Notice: Subject to any disclaimer, the term of this patent is extended or adjusted under 35 U.S.C. 154(b) by 96 days.

(21) Appl. No.: 13/526,343

(22) Filed: Jun. 18, 2012

(51) Int. Cl.
G10L 21/00 (2013.01)
G10L 25/00 (2013.01)

(52) U.S. Cl.
USPC .................. 704/272; 704/246; 704/258

(58) Field of Classification Search
CPC combination set(s) only.
See application file for complete search history.

(56) References Cited

U.S. PATENT DOCUMENTS

| | | | |
|---|---|---|---|
| 5,351,189 A | 9/1994 | Doi et al. | |
| 5,657,426 A | 8/1997 | Waters et al. | |
| 5,737,489 A | 4/1998 | Chou et al. | |
| 5,978,754 A | 11/1999 | Kumano | |
| 6,208,956 B1 | 3/2001 | Motayama | |
| 6,356,922 B1 | 3/2002 | Schilit et al. | |
| 6,766,294 B2 | 7/2004 | MacGinite et al. | |
| 6,865,533 B2 * | 3/2005 | Addison et al. | 704/260 |
| 6,912,505 B2 | 6/2005 | Linden et al. | |
| 7,107,533 B2 | 9/2006 | Duncan et al. | |
| 7,231,351 B1 | 6/2007 | Griggs | |
| 7,693,719 B2 * | 4/2010 | Chu et al. | 704/270.1 |
| 8,106,285 B2 | 1/2012 | Gerl et al. | |
| 8,109,765 B2 | 2/2012 | Beattie et al. | |
| 8,131,545 B1 | 3/2012 | Moreno et al. | |
| 8,131,865 B2 | 3/2012 | Rebaud et al. | |
| 8,515,735 B2 * | 8/2013 | Chandrasekhar | 704/9 |
| 8,515,737 B2 * | 8/2013 | Allen | 704/9 |
| 8,548,618 B1 | 10/2013 | Story, Jr. et al. | |
| 8,577,668 B2 | 11/2013 | Rosart et al. | |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0116188 A1 | 8/2002 | Amir et al. | |
| 2003/0061028 A1 | 3/2003 | Dey et al. | |
| 2003/0083885 A1 | 5/2003 | Frimpong-Ansah | |
| 2003/0115289 A1 | 6/2003 | Chinn et al. | |
| 2004/0261093 A1 | 12/2004 | Rebaud et al. | |
| 2005/0276570 A1 * | 12/2005 | Reed et al. | 386/46 |

(Continued)

FOREIGN PATENT DOCUMENTS

| | | |
|---|---|---|
| EP | 2689346 | 1/2014 |
| NZ | 532174 | 1/2007 |

(Continued)

OTHER PUBLICATIONS

Beattie, Valerie et al., "Reading Assistant: Technology for Guided Oral Reading", Scientific Learning, Apr. 10, 2012, 5 pages.

(Continued)

*Primary Examiner* — Richemond Dorvil
*Assistant Examiner* — Thuykhanh Le
(74) *Attorney, Agent, or Firm* — Knobbe, Martens, Olson & Bear, LLP

(57) ABSTRACT

A content customization service is disclosed. The content customization service may identify one or more speakers in an item of content, and map one or more portions of the item of content to a speaker. A speaker may also be mapped to a voice. In one embodiment, the content customization service obtains portions of audio content synchronized to the mapped portions of the item of content. Each portion of audio content may be associated with a voice to which the speaker of the portion of the item of content is mapped. These portions of audio content may be combined to produce a combined item of audio content with multiple voices.

29 Claims, 9 Drawing Sheets

(56) References Cited

U.S. PATENT DOCUMENTS

| | | |
|---|---|---|
| 2006/0148569 A1 | 7/2006 | Beck |
| 2007/0016314 A1 | 1/2007 | Chan et al. |
| 2007/0061487 A1 | 3/2007 | Moore et al. |
| 2007/0118378 A1* | 5/2007 | Skuratovsky ............... 704/260 |
| 2007/0136459 A1 | 6/2007 | Roche et al. |
| 2008/0114601 A1* | 5/2008 | Boyle et al. ............... 704/270 |
| 2008/0120312 A1* | 5/2008 | Reed et al. ............... 707/100 |
| 2008/0177822 A1 | 7/2008 | Yoneda |
| 2008/0294453 A1 | 11/2008 | Baird-Smith et al. |
| 2009/0047003 A1 | 2/2009 | Yamamoto |
| 2009/0136213 A1 | 5/2009 | Calisa et al. |
| 2009/0222520 A1 | 9/2009 | Sloo et al. |
| 2009/0226862 A1* | 9/2009 | Thieberger Ben-Haom et al. ............... 434/167 |
| 2009/0226863 A1* | 9/2009 | Thieberger Ben-Haim et al. ............... 434/167 |
| 2009/0228570 A1 | 9/2009 | Janik et al. |
| 2009/0233705 A1 | 9/2009 | Lemay et al. |
| 2009/0276215 A1 | 11/2009 | Hager |
| 2009/0319273 A1 | 12/2009 | Mitsui et al. |
| 2009/0326948 A1* | 12/2009 | Agarwal et al. ............... 704/260 |
| 2010/0042411 A1* | 2/2010 | Addessi et al. ............... 704/270 |
| 2010/0042682 A1 | 2/2010 | Kaye |
| 2010/0064218 A1 | 3/2010 | Bull et al. |
| 2010/0070575 A1 | 3/2010 | Bergquist et al. |
| 2010/0211199 A1* | 8/2010 | Naik et al. ............... 700/94 |
| 2010/0279822 A1 | 11/2010 | Ford |
| 2010/0286979 A1 | 11/2010 | Zangvil et al. |
| 2010/0287256 A1 | 11/2010 | Neilio |
| 2011/0067082 A1 | 3/2011 | Walker |
| 2011/0087802 A1 | 4/2011 | Witriol et al. |
| 2011/0119572 A1 | 5/2011 | Jang et al. |
| 2011/0177481 A1 | 7/2011 | Haff et al. |
| 2011/0191105 A1 | 8/2011 | Spears |
| 2011/0231474 A1 | 9/2011 | Locker et al. |
| 2011/0246175 A1 | 10/2011 | Yi et al. |
| 2011/0288861 A1* | 11/2011 | Kurzweil et al. ............... 704/235 |
| 2011/0288862 A1 | 11/2011 | Todic |
| 2011/0296287 A1 | 12/2011 | Shahraray et al. |
| 2012/0030288 A1 | 2/2012 | Burckart et al. |
| 2012/0109640 A1 | 5/2012 | Anisimovich et al. |
| 2012/0150935 A1 | 6/2012 | Frick et al. |
| 2012/0166180 A1 | 6/2012 | Au |
| 2012/0197998 A1 | 8/2012 | Kessel et al. |
| 2012/0245719 A1 | 9/2012 | Story, Jr. et al. |
| 2012/0245720 A1 | 9/2012 | Story, Jr. et al. |
| 2012/0245721 A1 | 9/2012 | Story, Jr. et al. |
| 2012/0246343 A1 | 9/2012 | Story, Jr. et al. |
| 2012/0311625 A1* | 12/2012 | Nandi ............... 725/28 |
| 2012/0315009 A1 | 12/2012 | Evans et al. |
| 2012/0324324 A1 | 12/2012 | Hwang et al. |
| 2013/0041747 A1 | 2/2013 | Anderson et al. |
| 2013/0073449 A1 | 3/2013 | Voynow et al. |
| 2013/0073675 A1 | 3/2013 | Hwang et al. |
| 2013/0074133 A1 | 3/2013 | Hwang et al. |
| 2013/0257871 A1 | 10/2013 | Goldstein et al. |
| 2013/0262127 A1 | 10/2013 | Goldstein et al. |
| 2013/0268826 A1* | 10/2013 | Nowakowski et al. ....... 715/203 |
| 2013/0332167 A1* | 12/2013 | Kilgore ............... 704/251 |
| 2014/0005814 A1 | 1/2014 | Hwang et al. |
| 2014/0039887 A1 | 1/2014 | Dzik et al. |
| 2014/0040713 A1 | 2/2014 | Dzik et al. |
| 2014/0258462 A1* | 9/2014 | Hwang ............... 709/219 |

FOREIGN PATENT DOCUMENTS

| | | |
|---|---|---|
| WO | WO 2011/144617 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Levinson, S.E. et al., "Continuous Speech Recognition from a Phonetic Transcription", Acoustics, Speech, and Signal Processing, Apr. 1990, pp. 190-199.

Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.

Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.

Fabio Vignoli et al., Aug. 7-10, 1999, A Text-Speech Synchronization Technique With Applications to Talking Heads, Auditory-Visual Speech Processing, ISCA Archive.

Yardena Arar, Jan. 7, 2010, Blio E-Book Platform: No Reader (Yet), But Great Graphics.

International Search Report re International Application No. PCT/US13/33935 mailed on Jul. 3, 2013.

International Search Report issued for PCT/US12/30198 mailed on Jun. 20, 2012, 16 pages.

U.S. Appl. No. 12/360,044, filed Jan. 26, 2009, entitled "Testing Within Digital Media Itmes."

U.S. Appl. No. 13/531,376, filed Jun. 22, 2012, entitled "Modelling Expected Errors for Discriminative Training."

U.S. Appl. No. 13/536,711, filed Jun. 28, 2012, entitled "Pacing Content."

U.S. Appl. No. 13/662,306, filed Oct. 26, 2012, entitled "Content Presentation Analysis."

Dzik, S.C., U.S. Appl. No. 13/604,482, filed Sep. 5, 2012, entitled Identifying Corresponding Regions of Content.

Dzik, S.C., U.S. Appl. No. 13/604,486, filed Sep. 5, 2012, entitled Selecting Content Portions for Alignment.

International Search Report issued in connection with International Patent Application No. PCTUS12/30186 mailed on Jun. 20, 2012, 12 pages.

International Search Report and Written Opinion in PCT/US2013/042903 mailed Feb. 7, 2014.

International Search Report issued in connection with International Application No. PCT/US13/53020 mailed on Dec. 16, 2013.

* cited by examiner

SELECT A PORTION OF THE TEXT, THEN CLICK A CHARACTER'S NAME TO ASSIGN THAT CHARACTER TO THE TEXT.

*Two men dressed in blue observed him.*

*"Comrade," said one, "here is a well-built young fellow, and of proper height."* 702

*They went up to Candide and very civilly invited him to dinner.*

*"Gentlemen," replied Candide, with a most engaging modesty, "you do me great honour, but I have not wherewithal to pay my share."*

*"Oh, sir," said one of the blues to him, "people of your appearance and of your merit never pay anything: are you not five feet five inches high?"* 704

*"<u>Yes, sir, that is my height,</u>" answered he, making a low bow.*

*"Come, sir, seat yourself; not only will we pay your reckoning, but we will never suffer such a man as you to want money; men are only born to assist one another."*

*"You are right," said Candide; "this is what I was always taught by Mr. Pangloss, and I see plainly that all is for the best."*

706　　　　　　708　　　　　710　　　　　712

( Candide )　( Soldier 1 )　( Soldier 2 )　( Other... )

714

( Assign to Background )

MULTIPLE VOICES IN AUDIO CONTENT

BACKGROUND

Some audiobooks and other items of audio content are recorded with only one voice actor. Multiple versions of a particular item of audio content may exist, each vocalized by only one voice actor. The one-voice approach may leave listeners unsatisfied, however. For example, consumers of an audiobook may want the female characters voiced by female voice actors, and male characters voiced by male voice actors. In another example, listeners of an audiobook may want a different voice actor for each character in the audiobook. Neither outcome is possible with only one voice actor.

Recording a new audiobook with multiple voice actors is one option for customizing an item of audio content, but this approach has its limits. It may be impractical or expensive to coordinate multiple voice actors to generate a new recording. Additionally, listeners may want to assign voice actors to characters in different ways, which could necessitate a new recording for each listener. Moreover, listeners may have no interest in an audiobook featuring a disliked voice actor, even if multiple voice actors are already present in the audiobook. These problems and others are not merely limited to audiobooks, but may apply generally to any digital audio content, such as audio content included in songs, videos, movies, television programs, computer and video games, multi-media content, and the like.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 7 is a pictorial diagram depicting an illustrative user interface for mapping portions of an item of textual content with the speaker of that content.

DETAILED DESCRIPTION

Figure 1:
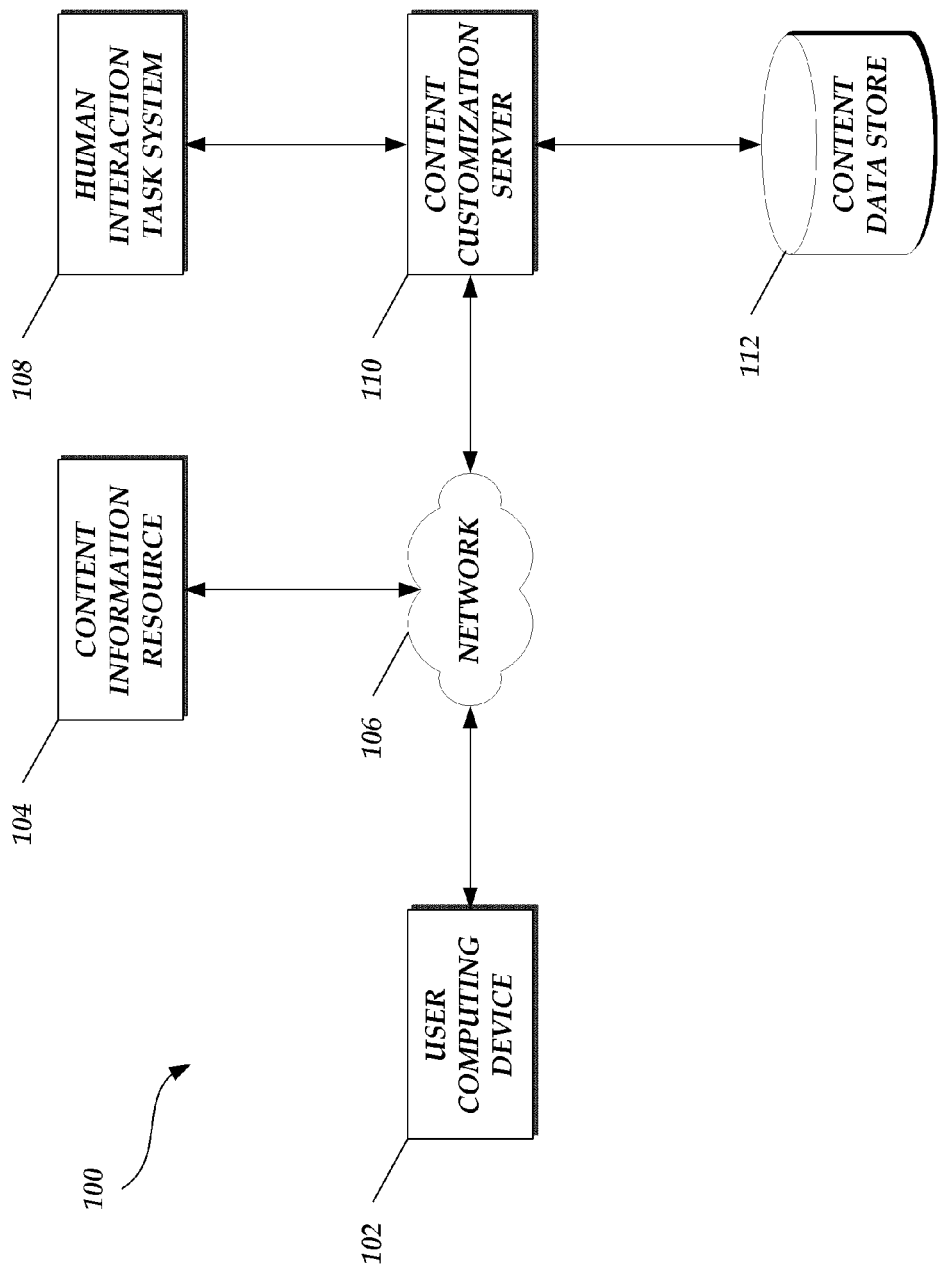
FIG. 1 is a schematic diagram of an illustrative network environment in which a content customization service may operate.

Generally described, aspects of the present disclosure relate to customizing items of audio content to include multiple voices. In this respect, a computer-implemented content customization service is described. In one embodiment, the content customization service maps one or more portions of an item of textual content to the characters in the item of content that speak those portions (e.g., as monologue, dialogue, etc.). The content customization service may synchronize these mapped portions with portions of multiple audio versions of the textual content, such as audiobooks recited or spoken by different voices. These synchronized audio portions may then be combined into a single item of audio content. Those skilled in the art will appreciate that many different types of digital audio content can be modified and combined by the content customization service. For example, the content customization service may modify audio content included in audiobooks, songs, videos, movies, television programs, computer and video games, and multi-media content, among other forms of digital audio content. Additionally, audio content for use with the content customization service may be generated by the content customization service itself, for example, by synthesizing spoken audio content from audio clips stored in an electronic data store.

In some embodiments, the content customization service maps one or more portions of an item of textual content to one or more speakers, who may represent literary characters, dramatic characters, commentators, orators, instructors, etc. present in the item of content as identified by, for example, named entity extraction or a list maintained by a content information resource. For example, a character in the item of content may have one or more lines of dialogue mapped to him or her. These mappings may be generated by analyzing the text of the item of textual content or, in some embodiments, converting an item of audio content into an item of textual content to be analyzed. For example, certain words, phrases, punctuation, spacing, and other features of the text can be used to determine whether a portion of textual content should be assigned to a speaker (e.g., for a line of dialogue) or to the "background" of the item of content (e.g., for first-person or third-person narration, forewords, prefaces, front matter, back matter, stage directions, etc.).

Several different techniques may be used to identify where dialogue is present in an item of content and to identify the speaker to whom the dialogue should be mapped. For example, stack-based techniques or heat maps may be used to identify when a speaker is likely to be present for a portion of an item of content, and stochastic prediction techniques or other predictive models can be used to map particular portions of an item of content to a particular speaker or to the background. Other techniques for analyzing items of content, such as named entity extraction, natural language techniques, statistical language models, and the like may be used instead of or in conjunction with the techniques described above. Additionally, machine techniques may optionally be supplemented with analysis from a human interaction task system, a computerized system including one or more computing devices configured to routine the results of tasks electronically assigned by the system to human workers for completion. The tasks are generally difficult, time-consuming, or impractical for a computer to answer, but relatively easy or quick for a human to answer.

The content customization service may supplement the machine analysis and mapping described above with user input. User interfaces may be presented to a user of the content customization service, for example, through his or her user computing device. These user interfaces may enable users to map portions of an item of content to a particular speaker, or to map a particular speaker to a particular voice actor, among other applications. These user-generated mappings may be used in conjunction with or instead of the mappings generated by the content customization service.

In one illustrative application, the content customization service is used to generate items of combined audio content in which all voices have a "correct" gender, age, accent, or the like. For example, a first audiobook that is voiced by only a male voice actor may include female characters, or vice versa. The male voice may speak one or more portions of a first audiobook associated with a female character, for example. However, a second audiobook for the same item of content may exist, this one voiced by a female voice actor. Accordingly, in one embodiment, the content customization service may identify one or more portions of the first audiobook that are associated with a female character. These identified portions of the first audiobook may be synchronized with similar or identical portions (e.g., containing many of the same words or all of the same words) in the second audiobook. The synchronized portions of the second audiobook may then be used to replace the identified portions of the first audiobook to form a combined audiobook that includes the portions narrated by the male voice actor and the portions narrated by the female voice actor.

In a more specific illustrative application, the book (or electronic book) "Jane Eyre" has two important speakers: the Jane Eyre female character and the Edward Fairfax Rochester male character. Three audiobook versions of "Jane Eyre" may exist. The first version may be narrated by a female voice, and the second version may be narrated by a male voice. Accordingly, the content customization service may analyze the book (or electronic book) "Jane Eyre" to identify one or more portions of the book associated with the Jane Eyre character. These portions of the book may be synchronized with portions of the audiobook narrated by the female voice, and the synchronized audiobook portions may be extracted therefrom. The content customization service may also analyze the book (or electronic book) "Jane Eyre" to identify one or more portions of the book associated with the Edward Fairfax Rochester character. These portions of the book may be synchronized with portions of the audiobook narrated by the male voice, and the synchronized audiobook portions may be extracted therefrom. Finally, the content customization service may replace portions of the third audiobook version of Jane Eyre (which may be used to provide background narration) with the extracted portions from the first and second versions of the audiobook to create a combined audiobook that also provides a gender-correct narrative experience.

Turning to FIG. 1, an illustrative network environment 100 is shown. The network environment 100 may include a user computing device 102, a content information resource 104, a network 106, a human interaction task system 108, a content customization server 110, and a content data store 112.

The user computing device 102 may be any computing device capable of communicating over the network 106, such as a laptop or tablet computer, personal computer, personal digital assistant (PDA), hybrid PDA/mobile phone, mobile phone, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like. The user computing device 102 may be operative to generate or display user interfaces for customizing items of content according to user input, such as assigning characters to portions of dialogue, or assigning voices to speakers, as discussed in detail with respect to FIG. 7 and FIG. 8. The user computing device 102 may transmit a desired customization over the network 106 to the content customization server 110, and may also receive modified or customized content over the network 106 from the content customization server 110. The user computing device 102 may also be capable of conveying items of audio content by directing audible output through speakers, headphones, or the like.

The content information resource 104 may be accessed over the network 106 to provide the content customization service with information regarding items of content. For example, the content information resource 104 may maintain information such as a list of speakers (such as characters) of in an item of content; quotes from speakers in an item of content; whether the item of content is narrated from a first-person or third-person perspective; or partial or complete speaker-dialogue maps for an item of content. Examples of content information resources include, but are not limited to, network-based reviewing communities, such as those that review books, audiobooks, music, movies, etc.; a network-based encyclopedia; a network-based knowledge base; a network-based electronic bulletin board; or a network-based content catalog, as may be maintained by a library or network-based retailer. The content information resource 104 may also maintain satisfaction or popularity ratings for items of content, sometimes referred to herein as "listener ratings." These ratings may reflect, for example, the number of users who have consumed an item of content by a particular narrator, or a "star" or numerical rating for a narrator or an item of content, among other indicators of satisfaction or popularity.

Network 106 may be any wired network, wireless network or combination thereof. In addition, the network 106 may be a personal area network, local area network, wide area network, cable network, satellite network, cellular telephone network, or combination thereof. Protocols and devices for communicating via the Internet or any of the other aforementioned types of communication networks are well known to those skilled in the art of computer communications and thus, need not be described in more detail herein.

A human interaction task system 108 may be included in the network environment to assist the content customization server 110. Generally described, the human interaction task system 108 is a computerized system, including one or more computing devices, that electronically processes human interaction tasks (HITs). A HIT may be a difficult, time-consuming, or expensive task for a computing device to perform. However, it might be relatively easy and quick for a human to perform a HIT. Accordingly, the human interaction task system 108 might request a human worker to perform a HIT, e.g., for gathering information or answering a query, and to return the results or answers to the human interaction task system 108 for further processing and/or presentation to the requestor. Thus, in some embodiments, the content customization service directs the human interaction task system 108 to pose one or more tasks about an item of content to a human worker of the human interaction task system 108. In one example, the human worker may be asked to identify a list of characters or other speakers in an item of content. In another example, the human worker may be asked to identify dialogue in a passage of text or in an audiobook. The human worker may also be asked to identify the speaker of the dialogue. The human worker of the human interaction task system 108 may volunteer to respond to these tasks and communicate other information about the item of content to the content customization server 110.

The content customization server 110 is a computing device that may perform a variety of tasks to customize items of content. For example, the content customization server 110 may receive a request to customize content from the user computing device 102 over the network 106. To generate customized content, the content customization server may process one or more items of content stored in data store 112 using information obtained from the content information resource 104 and input from the user computing device 102 and the human interaction task system 108. The content customization server 110 may then transmit the customized content over the network 106 to the user computing device 102. Additional operations of the content customization server 110, such as synchronizing and combining items of content, performing speech-to-text conversions, and performing text-to-speech conversions, are described with respect to FIG. 2.

The content customization server 110 may be in communication with a content data store 112. The content data store 112 may store one or more items of audio or textual content. For example, the content data store 112 may store audiobooks, music, computer or video games, movies, multi-media content, electronic books or plays, audiobook transcripts, narration scripts, song lyrics, etc. In some embodiments, the content data store 112 stores multiple versions of the same item of content, also known as companion items of content. For example, the content data store 112 may store multiple companion renditions of the same audiobook: one spoken by Sam Speaker, one spoken by Nora Narrator, one spoken by Victor Voiceover, etc. The content data store 112 may also store multiple companion items of content across different media: for example, an electronic book version of Candide, and one or more audiobook versions of Candide.

The content data store 112 may also store information regarding these items of content. Similar to the content information resource 104, the content data store 112 may store a list of speakers (such as characters or commentators) in an item of content; quotes from speakers in an item of content; whether the item of content is narrated from a first-person or third-person perspective; or partial or complete speaker-dialogue maps for an item of content, for example, those generated by the content customization service or obtained from the content information resource 104.

The content data store 112 may also store audio clips spoken in one or more voices for use in synthesizing speech. An audio clip may include, for example, individual phonemes or syllables, words, phrases, or sentences. In some embodiments, a set of audio clips spoken by a particular voice actor may include enough audio clips that a speech synthesis program can construct any desired syllable, word, phrase, sentence, etc. in the voice actor's voice. Such speech synthesis programs are well-known in the art and need not be described in further detail here.

The content data store 112 may be embodied in hard disk drives, solid state memories, and/or any other type of non-transitory, computer-readable storage medium. The content data store 112 may be distributed or partitioned across multiple storage devices as is known in the art without departing from the spirit and scope of the present disclosure. Moreover, while content data store 112 is depicted in FIG. 1 as being local to the content customization server 110, those skilled in the art will appreciate that the content data store 112 may be remote to content customization server 110. For example, a content data store 112 may be integrated into or maintained by the user computing device 102 or the content information resource 104.

The user computing device 102 and content customization server 110 may each be embodied in a plurality of components, each executing an instance of the respective user computing device 102 and content customization server 110. A server or other computing system implementing the user computing device 102 and content customization server 110 may include a network interface, memory, processing unit, and computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and content customization server 110. The memory generally includes RAM, ROM, and/or other persistent and/or auxiliary, non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content customization server 110 may be represented in a single physical server or, alternatively, may be split into multiple physical servers. The entire content customization service may be represented in a single user computing device 102 as well. In other embodiments, the content customization service may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
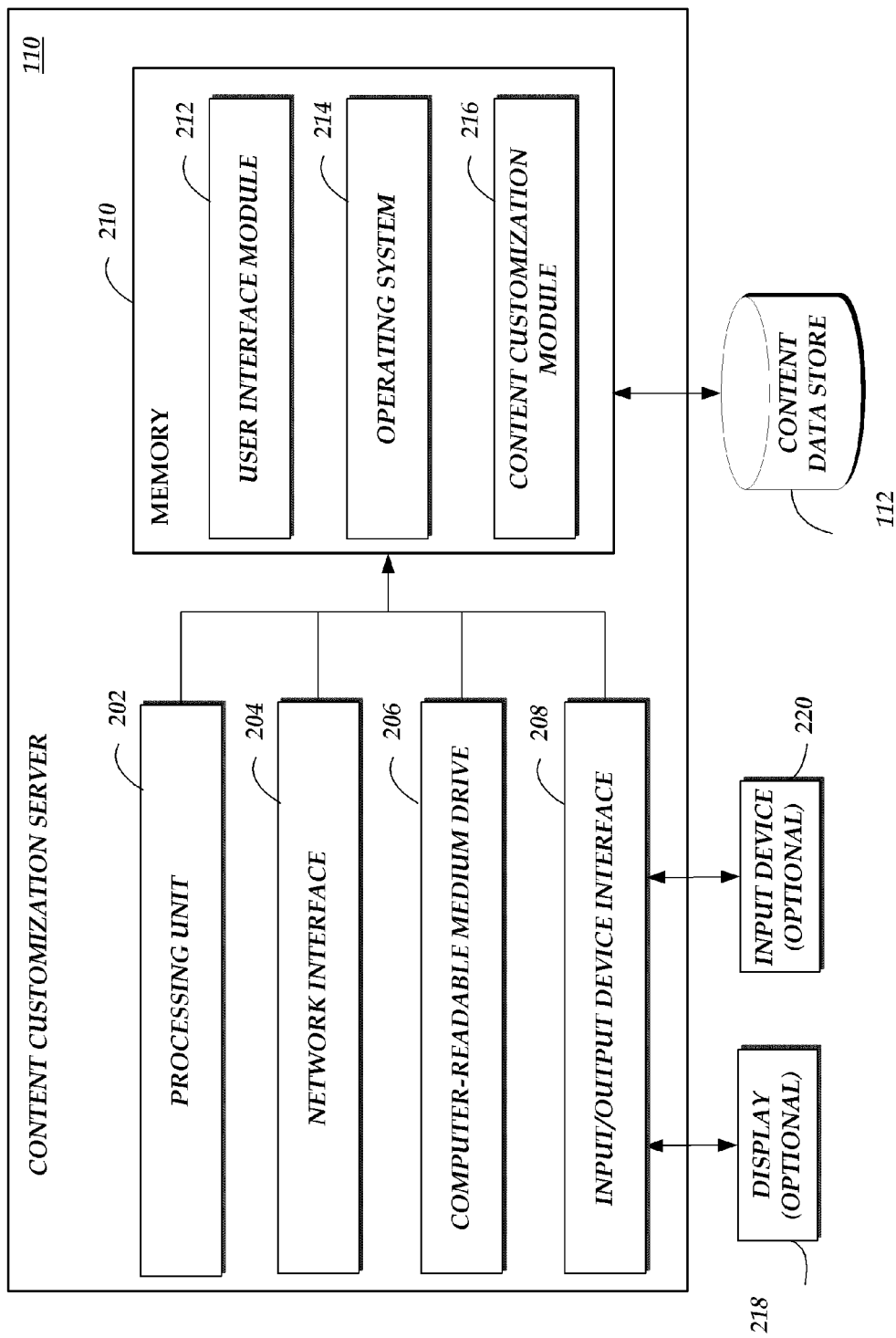
FIG. 2 is a schematic diagram of an illustrative content customization server.

FIG. 2 is a schematic diagram of the content customization server 110 shown in FIG. 1. The content customization server 110 includes an arrangement of computer hardware and software components that may be used to implement the content customization service. FIG. 2 depicts a general architecture of the content customization server 110 illustrated in FIG. 1. Those skilled in the art will appreciate that the content customization server 110 may include more (or fewer) components than those shown in FIG. 2. It is not necessary, however, that all of these generally conventional components be shown in order to provide an enabling disclosure.

The content customization server 110 includes a processing unit 202, a network interface 204, a non-transitory computer-readable medium drive 206, and an input/output device interface 208, all of which may communicate with one another by way of a communication bus. As illustrated, the content customization server 110 is optionally associated with, or in communication with, an optional display 218 and an optional input device 220. The display 218 and input device 220 may be used in embodiments in which users interact directly with the content customization server 110, such as an integrated in-store kiosk, for example. In other embodiments, the display 218 and input device 220 may be included in a user computing device 102 shown in FIG. 1. The network interface 204 may provide the content customization server 110 with connectivity to one or more networks or computing systems. The processing unit 202 may thus receive information and instructions from other computing systems (such as the user computing device 102) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the content customization service. The memory 210 generally includes RAM, ROM and/or other persistent or non-transitory computer-readable storage media. The memory 210 may store an operating system 214 that provides computer program instructions for use by the processing unit 202 in the general administration and operation of the content customization server 110. The memory 210 may further include other information for implementing aspects of the content customization service. For example, in one embodiment, the memory 210 includes a user interface module 212 that facilitates generation of user interfaces (such as by providing instructions therefor) for display upon a computing device such as user computing device 102. For example, a user interface may be displayed via a navigation interface such as a web browser installed on the user computing device 102. In addition, memory 210 may include or communicate with the content data store 112. Content stored in the content data store 112 may include items of textual content, items of audio content, and/or audio clips, as described in FIG. 1.

In addition to the user interface module 212, the memory 210 may include a content customization module 216 that may be executed by the processing unit 202. In one embodiment, the content customization module 216 may be used to implement the content customization service in order to synchronize items of audio content with each other or with items of textual content, map speakers (such as characters or commentators) to dialogue, combine items of audio content, synthesize speech, etc., as described further below.

Those skilled in the art will recognize that in some embodiments, the content customization service is implemented partially or entirely by the user computing device 102. Accordingly, the user computing device 102 may include a content customization module 216 and other components that operate similarly to the components illustrated as part of the content customization server 110, including a processing unit 202, network interface 204, non-transitory computer-readable medium drive 206, input/output interface 208, memory 210, user interface module 212, and so forth.

Figure 3:
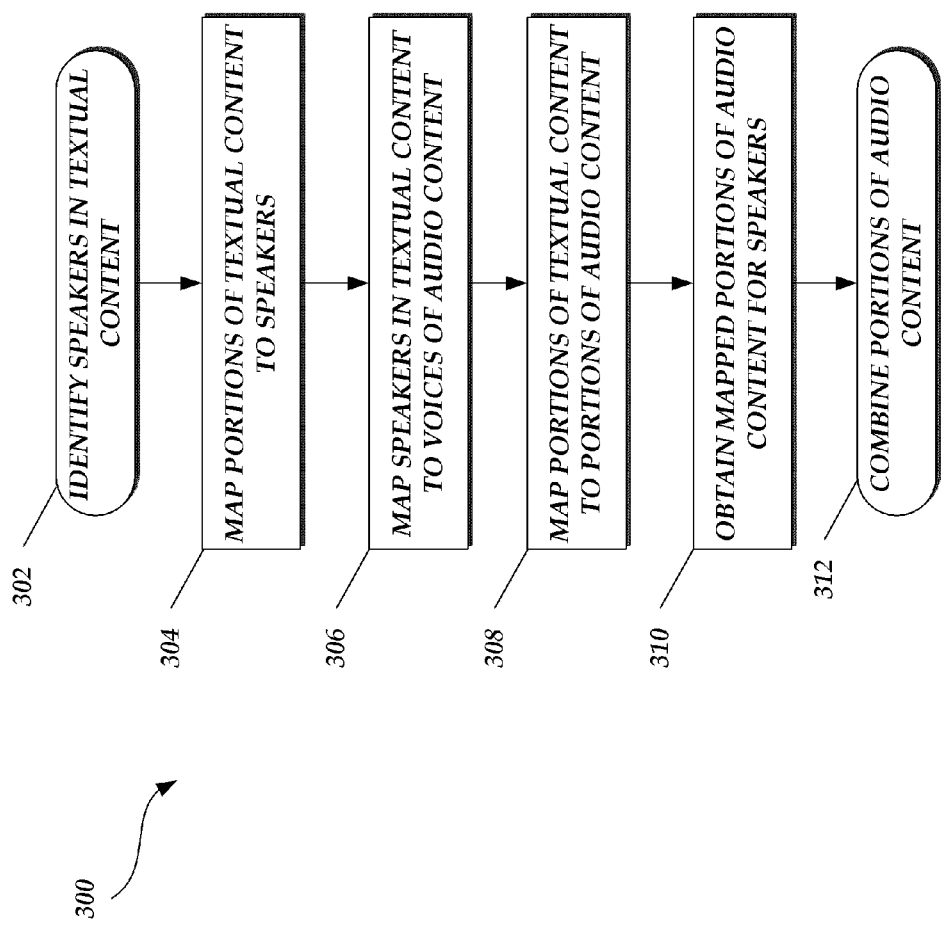
FIG. 3 is a flow diagram depicting an illustrative routine for combining portions of audio content associated with one or more voices.

FIG. 3 illustrates an example routine 300 that may be carried out by the content customization service through, for example, execution of the content customization module 216 on the content customization server 110. In block 302, the content customization service may identify the speakers, such as characters, commentators, and the like in an item of textual content. In one embodiment, the item of textual content is an electronic book. In another embodiment, the item of textual content is a textual transcript of an item of audio content, such as a narration script for an audiobook. In yet another embodiment, the item of textual content is generated by applying a speech-to-text converter to an item of audio content, such as an audiobook.

The speakers (which, as discussed above, may include characters, commentators, etc.) in the item of textual content may be identified in a number of ways. In one embodiment, the content customization service identifies the speakers by accessing information about the item of content from a content information resource 104 as shown in and as described with respect to FIG. 1. In another embodiment, the content customization service performs machine analysis on the item of textual content to identify speakers. For example, content scraping, named entity extraction, natural language techniques, regular expressions, syntactic analysis, or other techniques known in the art may be used to identify speakers. This machine analysis may optionally be supplemented with input from a human interaction task system.

The speakers identified in block 302 may then be mapped to portions of the textual content in block 304. For example, a character may be mapped to one or more lines of dialogue spoken by that character. A narrator may be mapped to a portion of the background textual content (i.e., non-dialogue portions of the content). An example computer-implemented routine for identifying dialogue and background narration in an item of textual content and for mapping speakers to portions of content is shown in FIG. 4, FIG. 5, FIG. 6A, and FIG. 6B.

The speakers in the textual content may then be mapped to voices in items of audio content, as shown in block 306. In one embodiment, the items of audio content are "companion" items to the textual content. For example, these items of audio content may be different audio versions of the same or similar textual content, such as one or more audiobooks based on the same electronic book. Each of the companion items of audio content may be spoken by a different voice actor. For example, one companion item may be spoken by Sam Speaker, another companion item may be spoken by Nora Narrator, and yet a third companion item may be spoken by Victor Voiceover. Accordingly, one speaker in the item of textual content may be mapped to Sam Speaker, another speaker in the item of textual content may be mapped to Nora Narrator, and yet a third speaker in the item of textual content may be mapped to Victor Voiceover.

In some embodiments, the content customization service selects which speakers are mapped to which voices based on attributes of the speakers and/or the voices. These attributes may include, for example, gender, accent, age, time period, native language, prosody, and the like. For example, the content customization service may access information about the attributes of speakers in an item of content from a content information resource 104, or may identify attributes of the speakers using natural language or other well-known content analysis techniques. The content customization service may also maintain information regarding the same attributes of voice actors present in items of audio content stored in the content data store 112. For example, the content customization service may request that each voice actor submit a profile describing his or her attributes. In other embodiments, the content customization service requests that a human worker of the human interaction task system 108 identify one or more attributes of a speaker or voice actor.

In one example application, attributes are used to create gender-correct items of audio content. For example, female speakers may be mapped to a female voice actor, and male speakers may be mapped to a male voice actor. For example, in Voltaire's novel Candide, the title character (male) may be mapped to Sam Speaker (also male), while Cunegonde (the female love interest of Candide) may be mapped to Nora Narrator (also female). In another example application, attributes are used to create items of audio content wherein a speaker with an accent is mapped to a voice actor who natively speaks with that accent. For example, a character with a Cockney (English) accent may be mapped to a voice actor who was born and raised in East London, where the accent is native. In yet another example application, attributes are used to generate age-correct items of audio content. For example, a child speaker may be mapped to a child voice actor. Still other applications for attribute-matching are possible.

In other embodiments, the content customization service maps voices to speakers based on listener ratings or user preferences. These ratings or preferences may be generated and stored by a user of a user computing device. These ratings may also or instead be maintained by the content customization service, on a content information resource, or on any other network resource, such as a network-based review aggregator that maintains reviews from many users. In one embodiment, a voice actor is mapped to a speaker based on a listener rating of the voice actor. This choice reflects that users may wish to have a popular voice actor mapped to the protagonist of an item of content, for example. In another embodiment, a voice actor is mapped to a speaker based on a listener rating of a particular companion item of content voiced by that voice actor. For example, an otherwise unknown or unpopular voice actor may have performed a very well-received rendition of an audiobook. In yet another embodiment, the content customization service analyzes previous user mappings of voices to speakers. For example, if a user has assigned a voice actor for many speakers over one or many different items of content, the content customization service may, for subsequent items of content, map the voice actor to one or more speakers utilizing the previous assignments.

In block 308, the portions of the textual content mapped to the speakers and voices may be mapped to portions of items of audio content. In some embodiments, portions of the item of textual content are synchronized with and then mapped to portions of one or more companion items of audio content. In some embodiments, portions of companion items of content are synchronized through the use of reference points that map portions of the one companion item of content to corresponding portions of another companion item of content. In a specific example, a segment of text (e.g., a word, line, sentence, etc.) may be mapped to a timestamp of a corresponding audio recording. Example methods for synchronizing an item of textual content with a companion item of audio content or for synchronizing two companion items of audio content are disclosed in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." The disclosures of both of these applications are hereby incorporated by reference in their entireties. Accordingly, in one embodiment, the portion of the item of textual content mapped to a speaker is synchronized with a portion of a companion item of audio content spoken by a voice mapped to the speaker. This mapping may be repeated across many different portions of the item of textual content for several different speakers (such as characters, commentators, etc.) and several companion items of audio content, each spoken by a voice mapped to one of the several speakers.

In an embodiment, a portion of an item of textual content is synchronized with and mapped to a portion of an item of audio content if both the item of textual content and the item of audio content include at least some percentage of words in common (text in the item of textual content, spoken words in the item of audio content). This percentage of words in common may be greater than about 75%, greater than about 95%, or about 100%. The threshold percentage of words in common may be selected based in part on the size of the portion of the item of textual content or the size of the portion of audio content. It may be more important to obtain exact matches for smaller portions of content, while larger portions of content may not require exact matches, but merely enough of a match to capture the gist of the portion of content. For example, different companion items of audio content (e.g., different companion audiobooks to an electronic book) may not be exact matches to the item of textual content, based on different interpretations of the item of textual content made by each different voice actor of the companion items of audio content.

These mapped portions of audio content may be gathered together in block 310. For example, the content customization server 110 may access one or more companion items of audio content stored in the content data store 112 to extract and obtain the mapped portions of the items of audio content. Those skilled in the art will appreciate that in some embodiments, one or more of the portions of audio content mapped to a portion of textual content may not be obtained from a companion item of audio content such as an audiobook. Rather, these portions of audio content may be obtained through other means. In one embodiment, a voice actor mapped to a speaker may generate a spoken recording of a portion of the textual content to which the speaker was mapped. In another embodiment, the content customization service may employ a text-to-speech converter and one or more clips of a voice actor's voice to generate a portion of audio content from a mapped portion of textual content, using speech synthesis techniques known in the art.

The mapped portions of each companion item of audio content and/or the audio portions generated by the content customization service may then be combined as shown in block 312. Thus, a combined item of audio content including portions of multiple items of audio content spoken by different voices may be generated. In one example, portions of multiple items of audio content may be concatenated to form a combined item of audio content. In another example, a portion of one item of audio content may be spliced into a second item of audio content. Still other ways to combine portions of items of audio content are possible.

Optionally, an acoustic profile of each item of audio content whose portions are to be combined may be generated. An acoustic profile for each item of audio content may include information about the acoustics of the environment in which each item of audio content was recorded or generated. For instance, the acoustic profile could include information about the level of reverberation for each item of audio content; information about whether any background noise is present in each item of audio content; and information about the effects of the equipment used to record or generate each item of audio content on the acoustic profile for that item of audio content, among other information. Using these acoustic profiles and audio mastering techniques known in the art, each portion of audio content present in the combined item of audio content may be smoothed or mastered to produce a seamless experience for the listener, for example, by smoothing some or all of the portions of items of audio content to give them the same acoustic profile.

Figure 4:
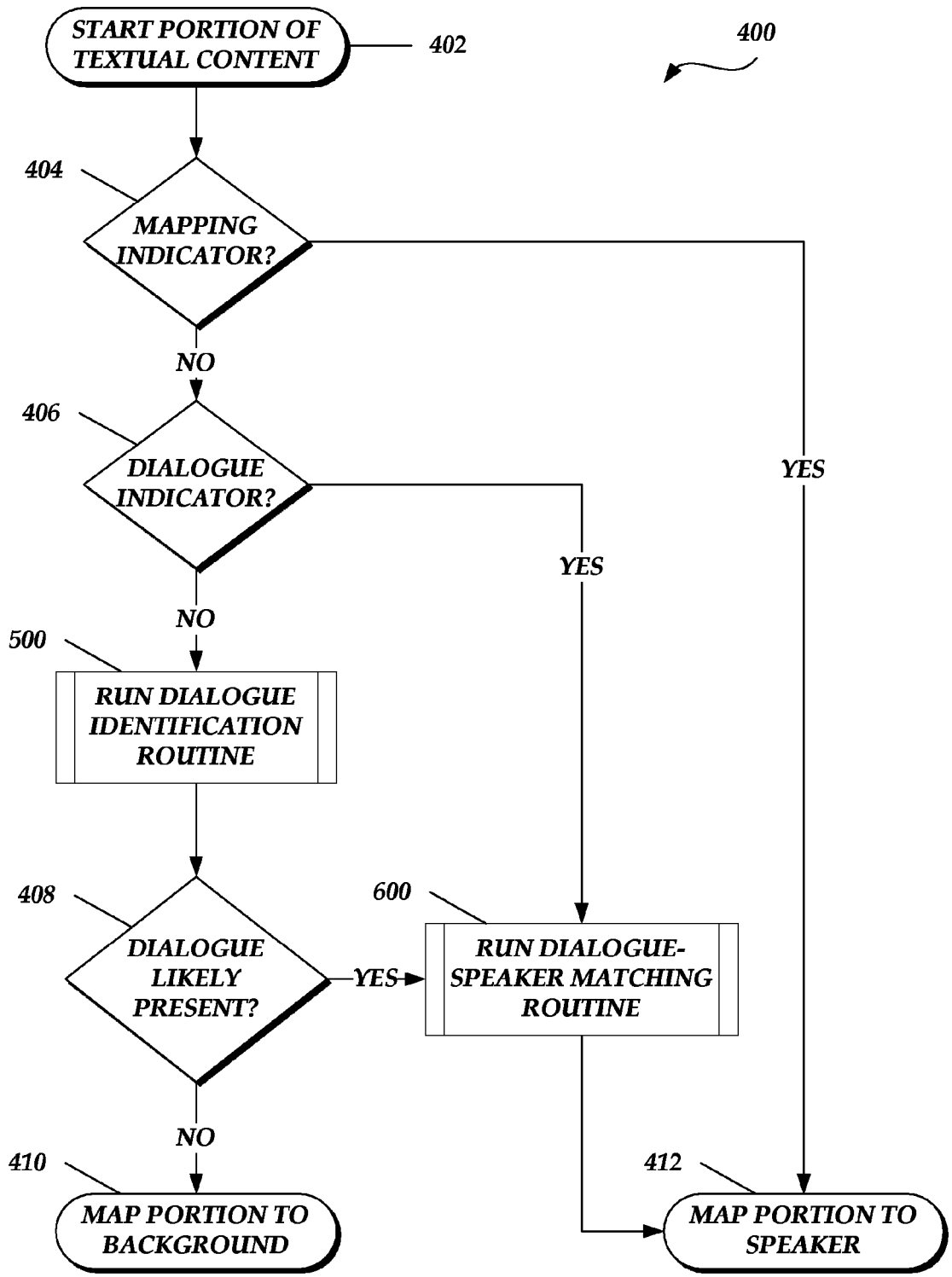
FIG. 4 is a flow diagram depicting an illustrative routine for identifying background and dialogue in an item of textual content.

FIG. 4 depicts an illustrative routine 400 for mapping portions of textual content to speakers. As discussed above, in some embodiments, content includes dialogue spoken by one or more speakers such as characters, and may also include background associated with a first-person narrator or a third-person narrator. The illustrative routine 400 may start at block 402, where a portion of textual content is selected for analysis.

In block 404, the content customization service may search for a mapping indicator in the portion of textual content under analysis. A mapping indicator may give a clear indication of the speaker of the portion of textual content. One example of a mapping indicator is the name of a character adjacent to a word indicating speech, such as "said," "proclaimed," "shouted," "yelled," "replied," "spoke," etc. Returning to the example of Candide, the following portion of text (reproduced also in FIG. 7) appears in an English translation of the novel:

"You are right," said Candide; "this is what I was always taught by Mr. Pangloss, and I see plainly that all is for the best."

Thus, in this example, the words "said Candide" indicate that Candide spoke the words in the vicinity. The words "said Candide" are an example of a mapping indicator, mapping the surrounding dialogue to Candide. Other examples of mapping indicators may include names in scripts that indicate who speaks which lines in the script, for example, when the item of textual content is a play. If such a mapping indicator is present, the portion of the text in the vicinity of the mapping indicator may be mapped to the speaker in the mapping indicator in block 412, with no further analysis necessary.

If no mapping indicator is present, the content customization service may then look for a dialogue indicator in the portion of the textual content, as shown in block 406. A dialogue indicator may generally suggest that dialogue is being spoken, without necessarily indicating the speaker of that dialogue. In some embodiments, dialogue indicators include punctuation or stylization typically associated with dialogue, such as quotation marks, inverted commas, inverted or upright exclamation points or question marks, guillemets, dashes, or italicization. In other embodiments, dialogue indicators include spaces between lines of the textual content, such as hard returns between lines of textual content, as might be present in a play. As discussed above, in some embodiments, the item of textual content is generated from one or more items of audio content by a speech-to-text converter. Punctuation filters known in the art may be incorporated into the speech-to-text converter to generate punctuated text, which may include the punctuation or spacing dialogue indicators described here. More information on the use of punctuation filters in speech-to-text conversions to provide spacing and punctuation in textual transcriptions may be found in U.S. Pat. Pub. No. 2009/0124272, published on May 14, 2009, entitled "FILTERING TRANSCRIPTIONS OF UTTERANCES," the disclosure of which is hereby incorporated by reference in its entirety. In still other embodiments, dialogue indicators include a word indicating speech and a pronoun, such that it is clear that dialogue is present, even if the identity of the speaker of the dialogue remains unclear. An example of this sort of dialogue indicator might be "he said."

Figure 5:
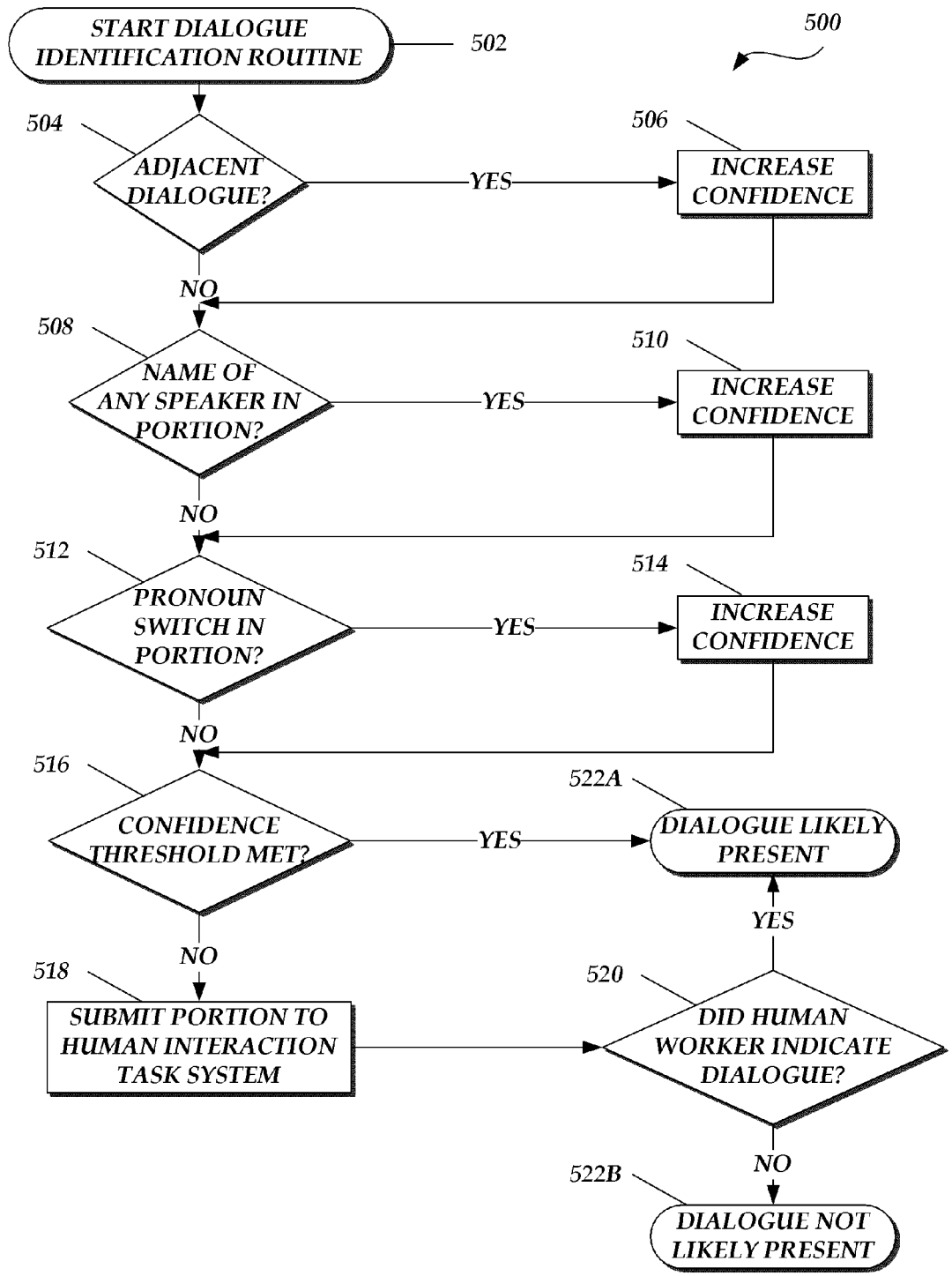
FIG. 5 is a flow diagram depicting an illustrative routine for identifying dialogue.
Figure 6A:
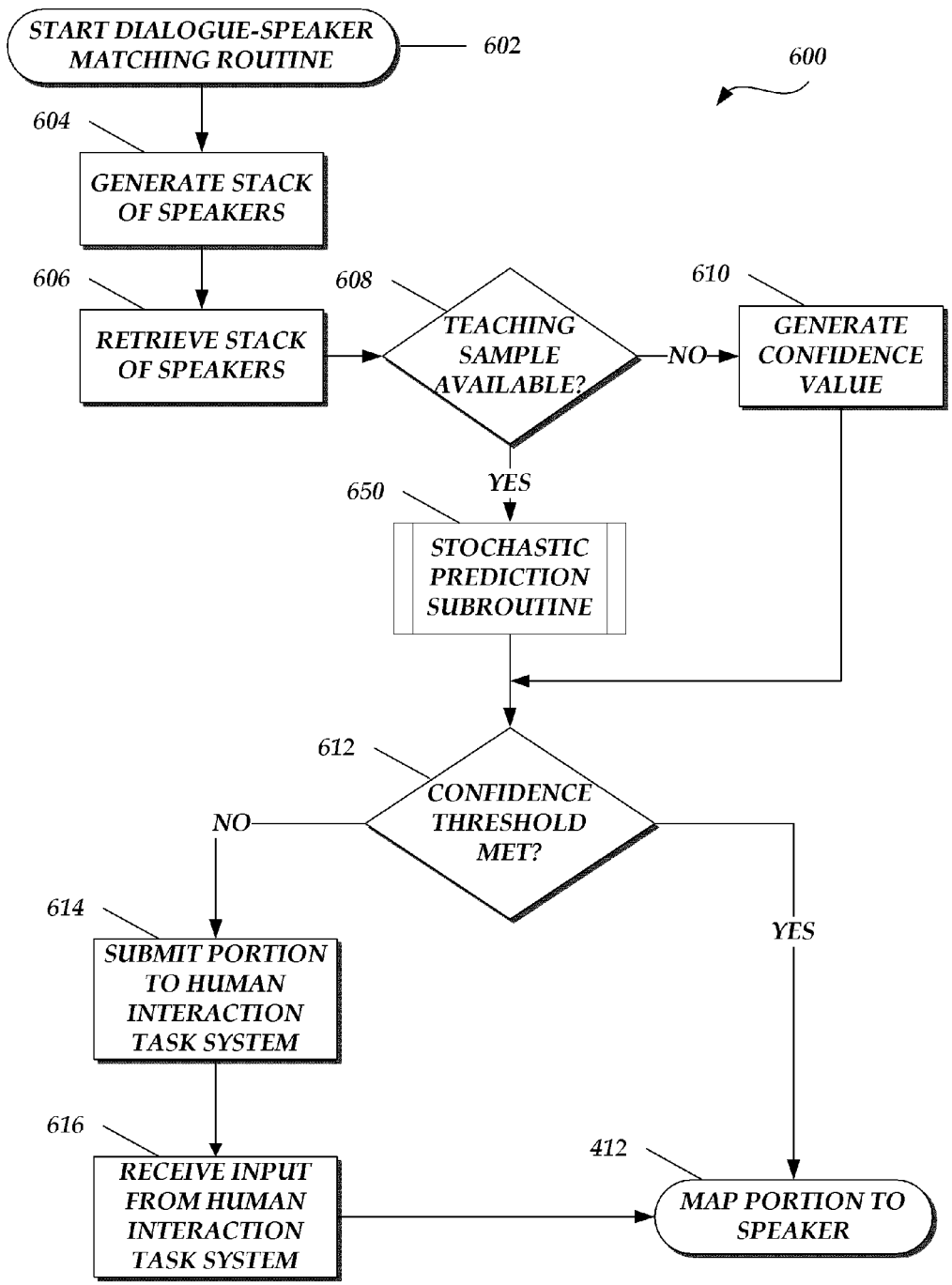
FIG. 6A is a flow diagram depicting an illustrative routine for mapping dialogue to a speaker of the dialogue.

If a dialogue indicator is present, the content customization service may attempt to map nearby dialogue to a speaker by following an illustrative routine 600, as shown in FIG. 6A. If no dialogue indicator is present, the content customization service may determine whether dialogue is likely to be present in the portion of textual content under analysis, as shown in routine 500 illustrated in FIG. 5. The routine 500 may determine whether dialogue is likely to be present, and may transfer its output to block 408. If dialogue is likely to be present, the content customization service may attempt to map it to a speaker, as shown by routine 600 and block 412. On the other hand, if dialogue is not likely present, the textual portion may be mapped to the background of the item of textual content in block 410. For example, the textual portion may be mapped to a first-person or third-person narrator of the item of textual content.

The routine 400 may be iterated or repeated a number of times, such that every portion of an item of textual content is mapped to a speaker or mapped to a background narrator. The routine 400 may also be iterated only a few times, such that fewer than all of the portions of the item of textual content are mapped, e.g., for use in generating a sample of a combined item of audio content, or for use in generating a teaching sample to aid in predicting mappings for the remainder of the item of textual content, as discussed with respect to FIG. 6B.

FIG. 5 depicts an illustrative routine 500 for identifying dialogue in an item of textual content. There may be no mapping indicators or dialogue indicators present in the portion of textual content under analysis. Accordingly, other factors may be used to identify dialogue in textual content. Based on the presence or absence of one or more of these factors, the content customization service may determine that dialogue is likely present, or that dialogue is not likely present.

The dialogue identification routine 500 starts in block 502 once called by routine 400. In block 504, the portion of textual content may be analyzed to see if any known dialogue is present in other nearby portions of the textual content. For example, if there is dialogue immediately prior to the portion of textual content being analyzed, it may be likely that the portion of textual content being analyzed also contains dialogue, such as a response to the dialogue in the previous portion. In one embodiment, the nearby known dialogue is identified by an iteration of the routine 400 operating on a nearby portion of textual content. In another embodiment, the nearby known dialogue is identified by a content information resource 104. For example, the content information resource 104 may maintain data on quotes spoken by characters in the item of textual content. If nearby dialogue is present, a dialogue confidence value may be increased in block 506. Otherwise, the content customization service may proceed directly from block 504 to block 508.

In block 508, the content customization service searches for the name of a known speaker in the portion of textual content being analyzed. As discussed above, speakers in an item of textual content may be identified by content scraping, named entity extraction, natural language techniques, regular expressions, syntactic analysis, or by a list maintained by a content information resource 104 or stored in content data store 112. If a speaker's name is present, the dialogue confidence value may be increased in block 510. This reflects the idea that a speaker may be addressed by name in a portion of dialogue. If a speaker's name is not present, the content customization service may proceed directly from block 508 to block 512.

In block 512, the content customization service may search for a pronoun switch in the portion of textual content under analysis. For example, the content customization service may determine that third person pronouns, such as "he," "she," "they," "their," and the like are present in a portion of the text immediately prior to the portion being analyzed. The portion being analyzed, by contrast, may include first person pronouns such as "I" or "me," or second person pronouns such as "you" or "your." A switch in pronouns may be likely to indicate dialogue. For example, a third-person background narrator may be likely to refer to speakers in the third person, while a speaker in a portion of dialogue may be unlikely to use third person pronouns to refer to himself or herself, or to others. Thus, in one embodiment, the content customization service looks for a switch from a third person pronoun to a first person pronoun or a second person pronoun, e.g., from "he" to "I" or "you." If the content customization service detects a pronoun switch, the dialogue confidence value may be increased in block 514. If no pronoun switch is present, the content customization service may proceed directly from block 512 to block 516.

In block 516, the content customization service determines if a dialogue confidence threshold has been met. As discussed above, the dialogue confidence value may be increased in block 506, block 510, and/or block 514. Each block may increase the dialogue confidence value by the same amount or by a different amount. If the dialogue confidence satisfies a threshold value set by the content customization service, the content customization service may deem that dialogue is likely present and proceed to block 522A. Block 522A may then report to block 408 that dialogue is likely present in the portion of textual content being analyzed.

If the dialogue confidence value does not satisfy the threshold set by the content customization service in block 516, the content customization service may submit the portion of the item of textual content to a human interaction task system 108. The content customization service may request that a human worker of the human interaction task system 108 determine whether dialogue is likely to be present in the portion of the item of textual content. For example, the human interaction task system 108 may present the portion of the item of textual content along with one or more adjacent portions on a computing device used by the human worker. The portions may be presented with a query to the worker, such as, "Is dialogue present in this passage? If so, where?" If the human worker indicates that dialogue is present, the content customization service may proceed to block 522A. Block 522A may report to block 408 that dialogue is likely present in the portion of textual content being analyzed. If the human worker indicates that no dialogue is present, the content customization service may proceed to block 522B. Block 522B may report to block 408 that dialogue is not likely present in the portion of textual content being analyzed. If dialogue is not likely present in the portion of textual content being analyzed, that portion may be assigned to the background in block 410. The background may be a first-person or third person narrator of the item of textual content, for example.

If a dialogue indicator is present as indicated by block 406, or if dialogue is likely present as indicated by the dialogue identification routine 500 and block 408, the content customization service may map the dialogue to a speaker by following a dialogue-speaker matching routine 600. The dialogue-speaker matching routine 600 may start in block 602 after being called by the routine 400.

The dialogue-speaker matching routine 600 may generate a "stack" of possible speakers in block 604. A stack may include a list of one or more speakers whose presence is indicated in one or more portions of the item of textual content. In some embodiments, the content customization service generates a stack for the entire item of content in order to indicate which speakers are likely to be present in which portions of the item of content. In other embodiments, the content customization service generates a stack only for the portion of the item of the content to be mapped, and optionally for one or more portions of the item of content in the vicinity of the portion of the item of content to be mapped. A stack may only be generated once by the content customization service, such that block 604 may be skipped in the illustrative routine 600 to perform subsequent mappings of speakers to portions of the item of content.

A speaker (such as a character or commentator) may be added to the stack for a portion of the item of textual content if his or name is present in the portion of the item of textual content or in a nearby portion; if another speaker mentions the speaker's name in a portion of item of textual content or in a nearby portion; or if words indicating a speaker's entrance are present (e.g., "A dark and shadowy figure approached," or "Will picked up the phone to dial Steve."). In some embodiments, speakers are removed from the stack for a portion of the item of content based on dialogue conventions often followed by items of textual content. For example, a speaker may be removed from the stack if he or she is mapped to a portion of textual content immediately prior or immediately after a portion of the item of textual content known to be mapped to the speaker. Removing a speaker from the stack on these grounds reflects the fact that in many items of textual content, a speaker is unlikely to have two consecutive lines of dialogue. In another example, a speaker may be removed from the stack if that speaker is not likely to speak at all in the portion of textual content being analyzed, based on information presented elsewhere in the item of textual content. For example, a speaker that is a dead character is unlikely to have any dialogue. Accordingly, if a character's death is detected in a portion of textual content (e.g., by using natural language techniques to look words such as "death" or "died," or by using information from a content information resource), that speaker may be removed from the stack for all subsequent portions of textual content, such that the dead speaker is not mapped to any of those subsequent portions of textual content. More information on identifying when speakers are likely to be present in a particular portion of an item of content may be found in U.S. patent application Ser. No. 12/972,058, entitled "GRAPHICALLY REPRESENTING ASSOCIATIONS BETWEEN REFERENTS AND STORIES," filed on Dec. 17, 2010; and in U.S. patent application Ser. No. 12/881,021, entitled "SYSTEMS AND METHODS FOR ASSOCIATING STORIES WITH RELATED REFERENTS," filed on Sep. 13, 2010. The disclosures of both of these applications are hereby incorporated by reference in their entireties.

The stack may be retrieved by the content customization service in block 606. Specifically, the content customization service may consult the stack to determine which speakers are on the stack for the portion of the item of content to be mapped. The content customization service may also determine how many speakers are on the stack for the portion of the item of textual content to be mapped.

In block 608, the content customization service determines if a teaching sample is available. A teaching sample may include several portions of an item of textual content for which correct mappings are known or have been previously generated. For example, several speakers may be mapped to portions corresponding to dialogue spoken by those speakers. These portions may be contiguous or discontiguous. Preferably, enough contiguous portions are present such that a Markov state transition matrix may be generated to predict transitions from one speaker on the stack to another speaker on the stack. The use of Markov state transition matrices and other stochastic prediction methods are discussed below with respect to FIG. 6B.

In one embodiment, the teaching sample is generated by a human interaction task system. For example, a human worker may be presented with a user interface such as that displayed in FIG. 7. The human worker may be asked one or more queries about one or more portions of an item of textual content. For example, the human worker may be asked to provide names of speakers; to identify which speakers are present; to locate dialogue; to identify who speaks which dialogue portions; to identify where background narration is present; and similar questions.

In another embodiment, the teaching sample is generated using information maintained by a content information resource. For example, the content information resource may maintain information on which speakers are associated with which portions of the item of textual content, such as quotes by speakers or conversations between speakers. The content customization service may use this information to map these portions of the item of textual content to their respective speakers. These mapped portions may then be used to generate a teaching sample.

In yet another embodiment, the teaching sample is generated iteratively by the content customization service. For example, the content customization service may map several portions of an item of textual content to speakers by following the routine 400 illustrated in FIG. 4. The content customization service may collect mappings previously generated to form a teaching sample, which may then be used to predict mappings for other portions of the item of textual content.

Figure 6B:
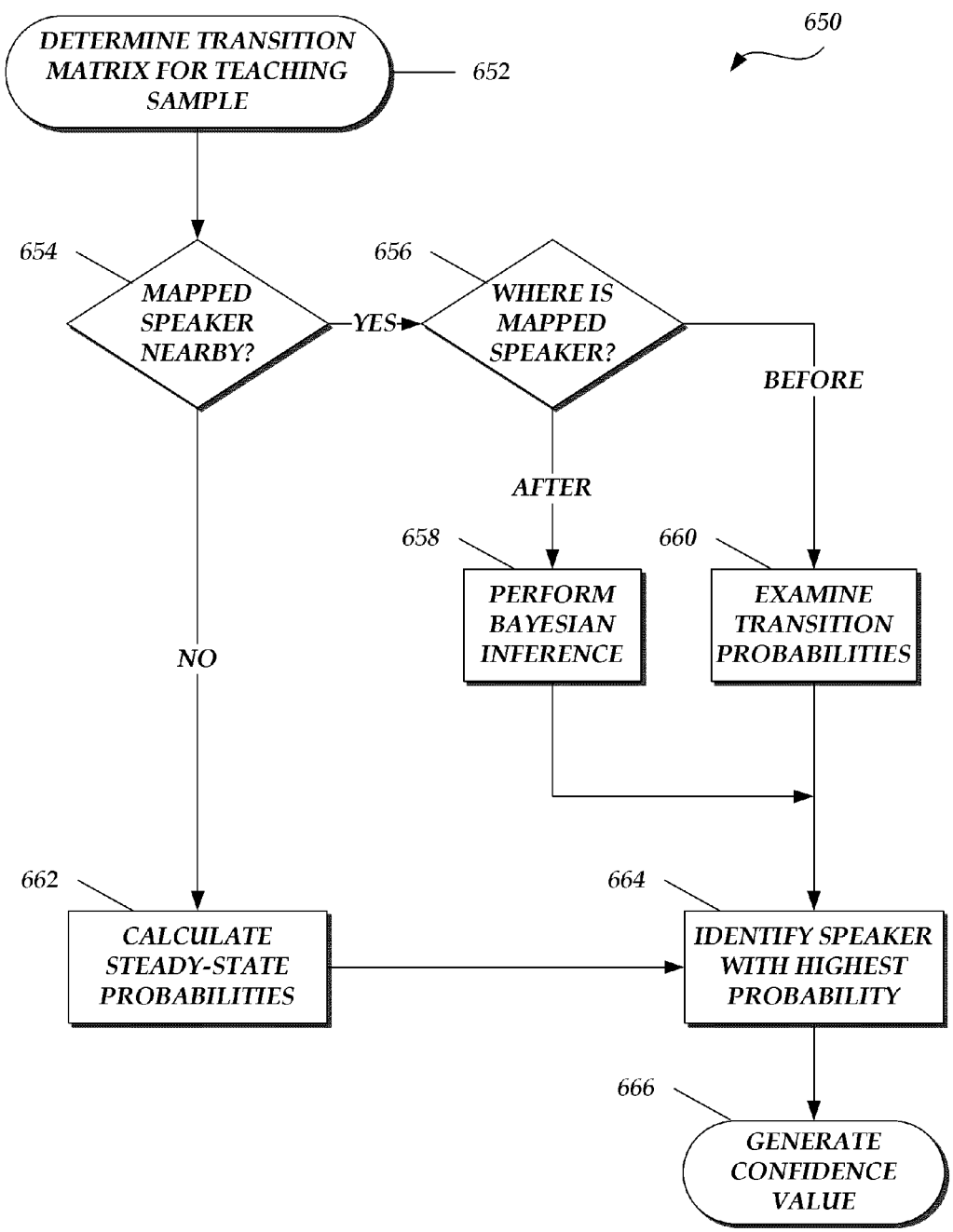
FIG. 6B is a flow diagram depicting an illustrative routine for stochastically predicting dialogue-speaker mappings.

If a teaching sample is available, the teaching sample may be used in conjunction with a stochastic prediction subroutine 650 as shown in FIG. 6B to predict speaker mappings in the portion of the item of textual content. The stochastic prediction subroutine may derive statistical information from the teaching sample and use that information to predict speaker-dialogue mappings and confidence values associated with those predicted mappings. However, if no teaching sample is available, the content customization service may attempt to guess which speaker should be mapped to the portion based on the speakers on the stack as determined in block 606. A confidence value of this guess may be generated in block 610. The confidence value may reflect a higher confidence level if few (or only one) speakers are on the stack. However, the confidence value may reflect a lower confidence level if many speakers are on the stack for the portion of the item of content as determined in block 606.

The confidence value generated in block 610 or generated by stochastic prediction subroutine 650 may be reported to block 612, in which the routine 600 determines whether a confidence threshold has been satisfied. If the confidence threshold is satisfied, the portion of the item of textual content may be mapped to the speaker guessed in block 610 or predicted in stochastic prediction subroutine 650.

If the confidence threshold is not satisfied in block 612, the portion of the item of textual content may be submitted to a human interaction task system in block 614. A human worker of the human interaction task system may be asked to identify which speaker is should be mapped to the portion of textual content. For example, the human worker may be provided with a list of the speakers on the stack for the portion of the item of content to be mapped, and asked to determine which speaker from the stack spoke the portion of the textual content. The human worker's response may be received by the content customization service in block 616 and used to map the portion of the textual content to the speaker in block 412.

FIG. 6B depicts an illustrative subroutine 650 that may be used to improve the accuracy of the speaker-dialogue mapping described with respect to FIG. 6A. The stochastic prediction subroutine 650 includes a basic Markov chain prediction model, but other stochastic methods, such as Hidden Markov Models, Bayesian inferences, or Monte Carlo methods may be used in addition to or instead of the Markov chain model illustrated herein. Additionally, the stochastic prediction subroutine 650 may not be used at all in some cases, such as when no teaching sample is available.

In block 652, a transition matrix based on a teaching sample of the item of content is generated. As discussed above, the teaching sample may include one or more portions of textual content mapped to speakers. These mappings may be generated by running the routine 400 shown in FIG. 4; by requesting input from a human interaction task system; or by accessing information from a content information resource, among other ways to generate mappings.

The transition matrix may be an m×m matrix, where m is the number of speakers present in the teaching sample. Each entry in this matrix may represent the probability of a transition in the teaching sample from a portion mapped to a first speaker to a portion mapped to a second speaker. To determine these probabilities, the content customization service may analyze all of the portions mapped to the first speaker. For example, a teaching sample may include three speakers: Alice (A), Bob (B), and Charles (C). Alice is mapped to six portions of the teaching sample, while Bob and Charles are only mapped to five each. Going through the teaching sample, the mappings for each portion of textual content in the teaching sample are in the following order:

A, B, C, B, B, A, C, A, C, A, B, C, A, C, B, A

There are fifteen transitions present in the teaching sample. Of the five transitions from A to a second speaker, zero are from A to A, two are from A to B, and three are from A to C. Thus, the probability of transitioning from A to A is zero, the probability of transitioning from A to B is 0.4, and the probability of transitioning from A to C is 0.6. Of the five transitions from B to a second speaker, two are from B to A, one is from B to B, and two are from B to C. Thus, the probability of transitioning from B to A is 0.4, the probability of transitioning from B to B is 0.2, and the probability of transitioning from B to C is 0.4. Of the five transitions from C to a second speaker, three are from C to A, two are from C to B, and zero are from C to C. Thus, the probability of transitioning from C to A is 0.6, the probability of transitioning from C to B is 0.4, and the probability of transitioning from C to C is zero. Accordingly, the transition matrix for this example teaching sample would be:

$$T = \begin{bmatrix} P_{AA} & P_{AB} & P_{AC} \\ P_{BA} & P_{BB} & P_{BC} \\ P_{CA} & P_{CB} & P_{CC} \end{bmatrix} = \begin{bmatrix} 0 & 0.4 & 0.6 \\ 0.4 & 0.2 & 0.4 \\ 0.6 & 0.4 & 0 \end{bmatrix}$$

Each row corresponds to a different first speaker and each column corresponds to a different second speaker. From top to bottom, the rows correspond to A, B, and C in that order as a first speaker. From left to right, the columns correspond to A, B, and C in that order as a second speaker. Those skilled in the art will appreciate that the entries along the diagonal of this and other transition matrices generated in block 652 may often be low or zero, reflecting the fact that speakers may infrequently be mapped to two consecutive portions of textual content (e.g., by talking to themselves, or by having their dialogue broken up by a mapping indicator, dialogue indicator or other background narration).

To determine how to apply the transition matrix, the content customization service may look for an already-mapped speaker near the portion of the item of textual content to be mapped to a speaker, as shown in block 654. If a known mapped speaker is near the portion of the item of textual content to be mapped to a speaker, the content customization service may then determine where the known mapped speaker is in relation to the portion of the item of textual content to be mapped to the speaker.

If the known mapped speaker is after the portion of the item of textual content to be mapped to a speaker, the content customization service may perform a Bayesian inference to predict the speaker in block 658. Using the terminology of the transition matrix above, the second speaker is the known speaker, and the first speaker is predicted for mapping to the portion of the item of textual content. Returning to the above example, let's say that the known speaker is C. A portion immediately prior to C's portion is to be mapped (e.g., C is the second speaker, and the speaker to be predicted is the first speaker). Accordingly, the content customization service may examine all of the possible transitions to C, and determine which transition is the most likely to have occurred. Here, the transition from A to C occurs with 0.6 probability, the transition from B to C occurs with 0.4 probability, and the transition from C to C occurs with zero probability. These probabilities may be divided by the sum of the probabilities of all transitions to C to determine the likelihood of each speaker being the speaker to whom the portion should be mapped. Thus, given C as a second speaker, the probability that A is the first speaker is (0.6)/(0.6+0.4+0), or 0.6. Given C as a second speaker, the probability that B is the first speaker is (0.4)/(0.6+0.4+0), or 0.4. Given C as a second speaker, the probability that C is also the first speaker is 0/(0.6+0.4+0), or 0. Thus, given that C is a known second speaker, it is most likely that A was the first speaker, since A has a higher probability of being the first speaker than B or C. Multiple iterations of Bayesian inference may be performed to map multiple portions to speakers; for example, mapping two or more portions prior to a portion mapped to a known speaker.

If the known mapped speaker is before the portion of the item of textual content to be mapped to a speaker, the content customization service may examine the transition probabilities from the transition matrix to predict the speaker of the portion of the item of textual content to be mapped in block 660. Returning to the above example, let's say that A is the speaker of a known portion, and that a portion immediately after A's portion is to be mapped. According to the transition matrix, the probability that a portion mapped to A immediately follows a portion mapped to A is 0. The probability that a portion mapped to B immediately follows a portion mapped to A is 0.4. Finally, the probability that a portion mapped to B immediately follows a portion mapped to A is 0.6.

If no known mapped speaker is near the portion of the item of textual content to be mapped to a speaker, the content customization service may instead proceed from block 654 to block 662, in which steady-state probabilities may be calculated. A steady-state probability for a speaker is simply the probability that a speaker should be mapped to any particular portion of the content, independent of any prior speaker mappings. As those skilled in the art will appreciate, Markov transition matrices may converge to a steady-state after only a few transitions. Accordingly, for relatively distant portions of text (e.g., where the portion to be mapped is perhaps five, ten, or more discrete portions of text away from a previously mapped portion of text), steady-state probabilities may accurately give the probability for each speaker to mapped to the portion of text. In some embodiments, the steady-state probabilities are simply calculated using the number of times a speaker is mapped to dialogue in the teaching sample. Returning to the example above, the steady-state probabilities for the teaching sample would be 3/8 for A, 5/16 for B, and 5/16 for C.

In other embodiments, the steady-state probabilities are determined by finding the 1×m eigenvector for λ=1 of the transition matrix, e.g., solving, for eigenvector q, the equation:

$$q(T-I)=0$$

where I is an m×m identity matrix (e.g., a matrix with 1's down its diagonal and zeroes for all other entries). Each entry along the row vector q would correspond to the steady-state probability for each speaker's mapping. In the above example, the first entry would be the steady-state probability of A, the second entry would be the steady-state probability of B, and the third entry would be the steady-state probability of C. In still other embodiments, the steady-state probabilities for the teaching sample are found by multiplying transition matrix T by itself until a steady state is reached, e.g., transition matrix T is multiplied by itself a number of times n such that $T^{(n-1)} \approx T^{(n)}$ or such that $T^{(n-1)}=T^{(n)}$. The steady-state probabilities for each speaker mapping may be found by reading left to right across any row in the product matrix. Those skilled in the art will recognize that the steady-state probabilities generated by the above-described eigenvector or matrix multiplication vectors may differ slightly from the steady-state probabilities generated by counting speaker mappings in the teaching sample. For example, there may not be a transition from the last mapped speaker in the teaching sample. Thus, for a contiguous teaching sample with n speaker mappings, there may be n−1 transitions from one speaker mapping to another. A teaching sample composed of k discontiguous passages containing a total of n mapped portions may include only n−k transitions.

With the probabilities for one or more speakers determined in block 658, block 660, or block 662, the content customization service may, in block 664, identify which speaker has the highest probability of being the correct speaker of the portion of textual content being analyzed. For example, returning to the steady-state example discussed above with respect to block 662, A has a probability of 3/8, while B and C only have a probability of 5/16 each. Accordingly, A would be identified as the most likely speaker of the portion of the textual of content in block 664. Those skilled in the art will recognize that there may be fewer speakers on the stack for the portion to be mapped than are present in the teaching sample. If a speaker is present in the teaching sample but not on the stack for the portion to be mapped, the probability of the portion being mapped to that speaker may simply be zeroed, with the remaining probabilities adjusted proportionally so that they sum to 1. Staying with the current example, Speaker C, with a steady-state probability of 5/16, may not be on the stack for the portion of the item of content to be mapped, as determined in block 606. Accordingly, the probability assigned to A may be adjusted to (3/8)/(1−5/16)=6/11, and the probability assigned to B may be adjusted to (5/16)/j(1−5/16)=5/11.

A confidence value of the speaker identification made in block 664 may be determined in block 666. Where many speakers (e.g., characters, commentators, etc.) could be mapped to the portion of textual content with roughly equal probability, this confidence value may be low. On the other hand, where the speaker identified in block 664 has a very high probability of being mapped to the portion of textual content, this confidence value may be higher. Additionally, the confidence value generated in block 666 may be weighted based on, for example, which method was used to identify the speaker with the highest probability: the Bayesian inference in block 658, the transition probabilities in block 660, or the steady-state probabilities in block 662.

The confidence value generated in block 666 may be reported to block 612 in FIG. 6A to determine if it meets the threshold. If it meets the threshold, the portion of the item of textual content may be mapped to the speaker identified in block 664. If not, the portion of the item of content may be submitted to a human interaction task system for further analysis as shown in block 614 and block 616.

As a practical matter, the transition matrix determined in block 652 may be very large, especially for items of content with large amounts of dialogue or many characters (and thus many transitions). Additionally, larger teaching samples, which may improve the accuracy of the stochastic prediction subroutine 650, may prompt the creation of large transition matrices or transition matrices that cover many transitions. Thus, forming the transition matrix in block 652, calculating the Bayesian probability in block 658, or calculating the steady-state probabilities in block 664 may require one or more computing devices to carry out, such as the user computing device 102 or the content customization server 110.

In some embodiments, no textual item of content is used with the above-illustrated routines. Rather, the routines illustrated herein may be followed to combine multiple companion items of audio content without the use of an item of textual content. For example, speech recognition techniques known in the art may be used to identify the words spoken in two or more companion items of audio content. With the words identified, the two or more companion items of audio content may be synchronized with one another by identifying portions in each item of audio content with words in common. For example, a portion of a first companion audiobook may be synchronized with a portion of a second companion audiobook if both portions have at least a certain percentage of words in common and in the same order, indicating substantially identical portions of audio content. Other methods for synchronizing portions of two or more companion items of audio content are possible. For example, companion items of audio content could be synchronized by track, chapter, or by increments of time (e.g., the portion of each item of audio content from the 10-minute 30-second mark to the 11-minute 15-second mark).

Mapping indicators, dialogue indicators, and the like may be identified in the audio content by using statistical language models and/or finite grammars in conjunction with the speech recognition techniques. More information on the use of statistical language models and finite grammars in speech recognition may be found in U.S. Pat. Pub. No. 2009/0124272, published on May 14, 2009, entitled "FILTERING TRANSCRIPTIONS OF UTTERANCES," previously incorporated by reference above.

As discussed above, in some embodiments, portions of textual content or portions of audio content may be mapped to a speaker automatically by the content customization service. Portions of content may also be mapped to speakers based on user input. FIG. 7 depicts an illustrative user interface 700 that may be used to assign characters to portions of textual content. The user interface 700 may display one or more portions of an item of textual content, which may be highlighted or otherwise selected by a user interacting with the user interface. For example, an unselected portion, such as unselected portion 702, may appear in regular type, while a selected portion, such as selected portion 704, may appear underlined, bolded, inverted, colored, etc.

When the user selects a portion, for example, by using a user input device to interact with a portion of the text displayed by the user interface 700, the user may then use a speaker control to map the selected portion of the text to the speaker. For example, the user may assign selected portion 704 to Candide by interacting with speaker control 706; to Soldier 1 by interacting with speaker control 708; or to Soldier 2 by interacting with speaker control 710. In some embodiments, a speaker control is present for every speaker on the stack as determined by block 604 and block 606 in FIG. 6A. If the user believes the correct speaker is not present, the user may interact with other speaker control 712. The user interface 700 may then display a partial or complete list of speakers determined to be present in the item of content. The user may select a speaker from this list to map the selected portion to that speaker. Alternately, the user may be prompted to type in the name of the correct speaker.

In some embodiments, the user interface 700 may also be displayed to a human worker of a human interaction task system. The human worker may provide input as to which portions of the item of textual content should be mapped to which speakers, if any, and the content customization service may receive that input. For example, this user interface may be displayed to a human worker in block 518 of FIG. 5 or in block 614 and 616 in FIG. 6A.

Figure 8:
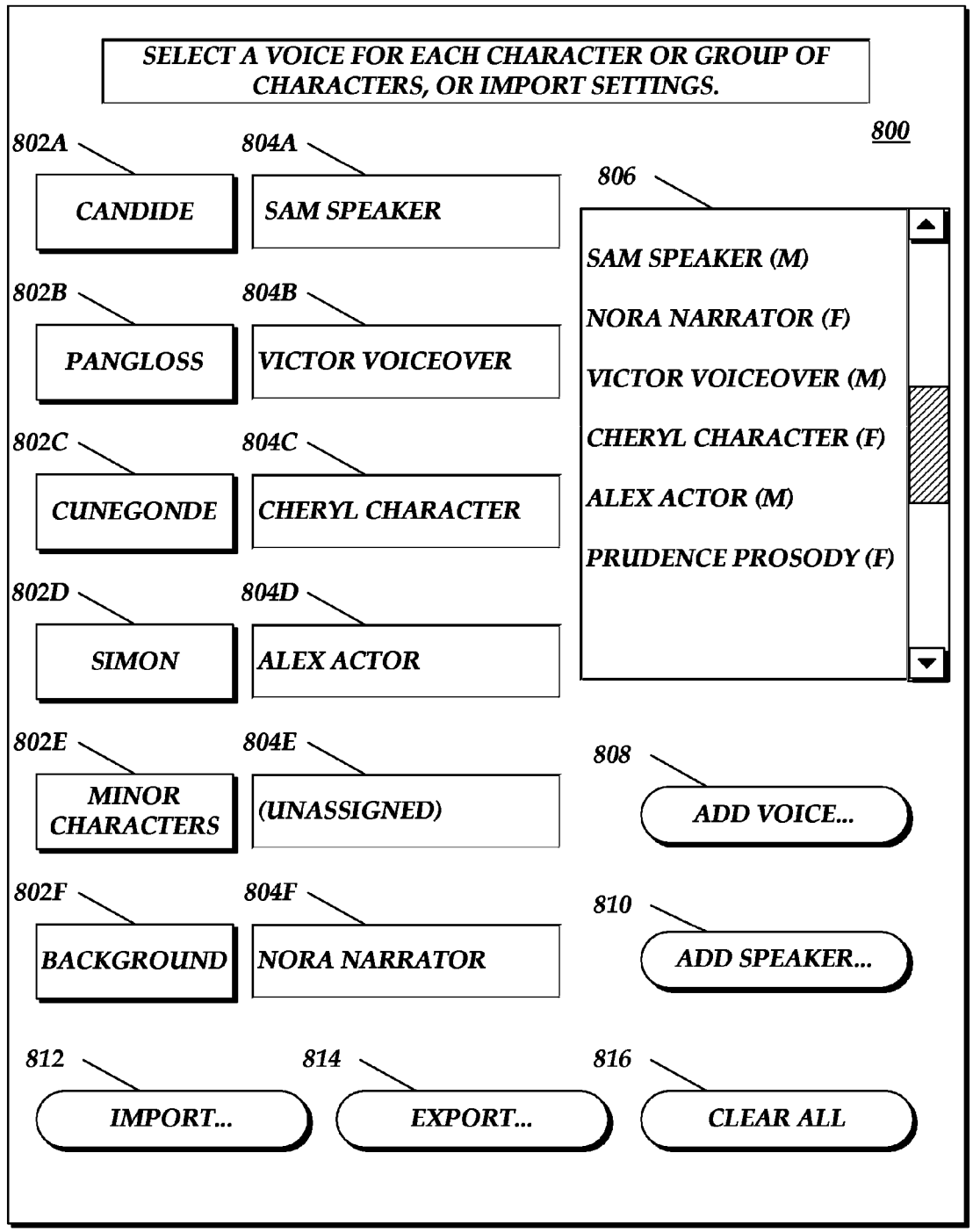
FIG. 8 is a pictorial diagram depicting an illustrative user interface for mapping speakers to voices.

As discussed above, in some embodiments, voices are automatically mapped to speakers based on, for example, the attributes of the voices and speakers. Voices may also be mapped to speakers through user input. FIG. 8 depicts an illustrative user interface 800 for assigning voices to speakers. The user interface 800 may include one or more speakers 802A-802D, as well as a minor characters slot 802E and a background voice 802F for portions not mapped to speakers. A user may select a voice from the voice menu 806 and place it in one or more voice slots 804A-804F.

In some embodiments, one voice may be assigned to all minor characters, either by the user or automatically by the content customization service. In other embodiments, different minor characters may be automatically assigned voices based on known attributes, if any, of the minor characters. Likewise, the background voice may be selected by the user or automatically by the content processing service. For example, for items of content including first person narration, the background voice may be the same voice as that assigned to the protagonist. In another embodiment, the background voice is a voice associated with a popular item of audio content that is a companion to the item of textual content.

The user may add voices to the voice menu by interacting with control 808. As discussed above, voices for mapped portions of audio content may be obtained from companion items of audio content, synthesized from a library of voice clips, or recorded by a voice at the request of the content customization service. The user may also add speakers to the list of speakers to map to voices by interacting with control 810. For example, the user may wish to map a separate voice to a speaker identified as a minor character by the content customization service. Returning to the example of Voltaire's novel Candide, other speakers that could be added might include Baron Thunder-ten-tronckh, the Old Woman, or the Turk.

Voice-speaker mappings may be collected into a voice-speaker mapping file. The user may import a voice-speaker mapping file stored on his or her user computing device or stored on a content customization server by interacting with the import control 812. The mappings specified by the voice-speaker mapping file may then be propagated to across the speaker, minor characters, and background slots 802A-802F and the voice slots 804A-804F. The user can also export or save voice-speaker mappings he or she has generated by interacting with the export control 814. Finally, should the user wish to clear all voice-speaker mappings, he or she may interact with the clear all control 816 to clear all voice slots 804A-804F.

In some embodiments, the user interface 800 may also be displayed to a human worker of a human interaction task system. The human worker may provide input as to which voices should be mapped to which speakers, and the content customization service may receive that input to map speakers to voices, as shown in block 306 of FIG. 3. These mappings may be collected into a voice-speaker mapping file and transmitted by the content customization server to a user computing device upon request.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for generating an audiobook with multiple voices, the system comprising:
    an electronic data store configured to store an item of textual content, a first companion audiobook associated with the item of textual content, and a second companion audiobook associated with the item of textual content; and
    a computing device in communication with the electronic data store, the computing, device configured to:
        identify a first speaker in the item of textual content;
        map the first speaker to a voice of the first companion audiobook, wherein the first companion audiobook comprises recorded audio content narrated by at least a first voice actor;
        map a first portion of the item of textual content to the first speaker;
        synchronize the first portion of the item of textual content with a portion of the first companion audiobook, wherein synchronizing the first portion of the item of textual content comprises identifying a portion of the first companion audiobook in which the first voice actor narrates words of the first portion of the item of textual content;
        identify a second speaker in the item of textual content;
        map the second speaker to a voice of the second companion audiobook, wherein the second companion audiobook comprises recorded audio content narrated by at least a second voice actor;
        map a second portion of the item of textual content to the second speaker;
        synchronize the second portion of the item of textual content with a portion of the second companion audiobook, wherein synchronizing the second portion of the item of textual content comprises identifying a portion of the second companion audiobook in which the second voice actor narrates words of the second portion of the item of textual content; and
        generate a combined audiobook, the combined audiobook comprising the synchronized portion of the first companion audiobook and the synchronized portion of the second companion audiobook.

2. The system of claim 1, wherein the first speaker and the first voice actor have an identical gender.

3. The system of claim 2, wherein the second speaker and the second voice actor have an identical gender.

4. The system of claim 1, wherein:
    the computing device is further configured to identify dialogue associated with the first speaker in the item of textual content; and
    the first portion of the item of textual content comprises the dialogue associated with the first speaker.

5. The system of claim 1, wherein:
    the computing device is further configured to identify dialogue associated with the second speaker in the item of textual content; and
    the second portion of the item of textual content comprises the dialogue associated with the second speaker.

6. A computer-implemented method for combining items of audio content, the method comprising:
    under control of one or more computing devices configured with specific computer-executable instructions,
        selecting a portion of an item of textual content;
        selecting a first companion item of audio content, wherein the first companion item comprises recorded audio content comprising words spoken by a first person;
        selecting a second companion item of audio content, wherein the second companion item comprises recorded audio content comprising words spoken by a second person;
        synchronizing a portion of the first companion item of audio content with the portion of the item of textual content, wherein synchronizing the portion of the first companion item of audio content comprises identifying a portion of the first companion item of audio content in which the first person speaks words of the portion of the item of textual content;
        synchronizing a portion of the second companion item of audio content with the portion of the item of textual content, wherein synchronizing the portion of the second companion item of audio content comprises identifying a portion of the second companion item of audio content in which the second person speaks words of the portion of the item of textual content; and
        replacing, in the first companion item of audio content, the synchronized portion of the first companion item of audio content with the synchronized portion of the second companion item of audio content to form a combined item of audio content.

7. The computer-implemented method of claim 6, wherein the portion of the item of textual content is selected based at least in part on input received from a human interaction task system.

8. The computer-implemented method of claim 6, wherein the portion of the item of textual content is selected based at least in part on user input.

9. The computer-implemented method of claim 6, wherein the portion of the item of textual content comprises dialogue associated with a speaker.

10. The computer-implemented method of claim 9 further comprising:

identifying one or more attributes of the speaker; and
wherein the second person has at least one attribute in common with the speaker.

11. The computer-implemented method of claim 10, wherein the at least one attribute in common is at least one of a common gender, common accent, and common age.

12. The computer-implemented method of claim 6, wherein the second companion item of audio content is selected based at least in part on a listener rating of a voice of the second person.

13. The computer-implemented method of claim 6, wherein the second companion item of audio content is selected based at least in part on a listener rating of the second companion item of audio content.

14. A non-transitory computer-readable medium storing computer executable instructions that, when executed by one or more computing devices, configure the one or more computing devices to perform operations comprising:
  selecting a companion item of audio content to a first item of audio content, the first item of audio content comprising a first recorded dialogue portion spoken by a first person, the companion item of audio content comprising a second recorded dialogue portion spoken by a second; and
  replacing, in the first item of audio content, the first recorded dialogue portion of the first item of audio content with the second recorded dialogue portion of the companion item of audio content to form a modified item of audio content, wherein the first recorded dialogue portion of the first item of audio content is replaced based at least in part on a determination that the second recorded dialogue portion of the companion item of audio content has one or more words in common with the first recorded dialogue portion of the first item of audio content.

15. The non-transitory computer-readable medium of claim 14, wherein the operations further comprise:
  identifying a background portion of the first item of audio content;
  identifying a background portion of the companion item of audio content, wherein the background portion of the companion item of audio content has one or more words in common with the background portion of the first item of audio content; and
  replacing, in the item of modified audio content, the background portion of the first item of audio content with the background portion of the companion item of audio content.

16. The non-transitory computer-readable medium of claim 14, wherein the operations further comprise identifying one or more attributes of a book character that is a speaker of words of the first recorded dialogue portion.

17. The non-transitory computer-readable medium of claim 16, wherein the operations further comprise:
  identifying one or more attributes of a voice of the second recorded dialogue portion of the companion item of audio content; and
  determining that the voice of the second recorded dialogue portion of the companion item of audio content has at least one attribute in common with the speaker.

18. The non-transitory computer-readable medium of claim 17, wherein the at least one attribute in common includes at least one of a common gender, a common accent, and a common age.

19. The non-transitory computer-readable medium of claim 14, wherein the companion item of audio content is selected based at least in part on a listener rating of the companion item of audio content.

20. The non-transitory computer-readable medium of claim 14, wherein the companion item of audio content is selected based at least in part on a listener rating of a voice of the second item of audio content.

21. A computer-implemented method for modifying an item of recorded audio content, the method comprising:
  under control of one or more computing devices configured with specific computer-executable instructions,
    associating an original portion of the item of recorded audio content with a speaker, wherein the audio content comprises recorded words spoken by a person in a first voice;
    obtaining textual content synchronized to the original portion of the item of recorded audio content;
    generating, from the synchronized textual content, replacement audio content spoken by a second voice; and
    replacing, in the original item of audio content, the original portion of the recorded item of audio content with the replacement audio content to form a modified item of audio content.

22. The computer-implemented method of claim 21, wherein the synchronized textual content comprises a portion of an electronic book that is a companion to the item of recorded audio content.

23. The computer-implemented method of claim 21, wherein the synchronized textual content comprises a textual transcript of the original portion of recorded audio content.

24. The computer-implemented method of claim 23, wherein the textual transcript is generated from the original portion of recorded audio content by a speech-to-text converter.

25. The computer-implemented method of claim 21, wherein the replacement audio content is generated from the synchronized textual content by a text-to-speech converter.

26. A computer-implemented method for modifying a first item of recorded audio content spoken by a first voice actor, the method comprising:
  under control of one or more computing devices configured with specific computer-executable instructions,
    synchronizing a portion of the first item of recorded audio content with a portion of a second item of recorded audio content spoken by a second voice actor;
    identifying an acoustic profile of the first item of recorded audio content;
    identifying an acoustic profile of at least the synchronized portion of the second item of recorded audio content;
    modifying the acoustic profile of at least the synchronized portion of the second item of recorded audio content, wherein the modified acoustic profile is substantially equivalent to the acoustic profile of the first item of recorded audio content; and
    replacing, in the first item of recorded audio content, the synchronized portion of the first item of recorded audio content with the synchronized portion of the second item of recorded audio content to form a modified item of audio content.

27. The computer-implemented method of claim 26 further comprising:
  synchronizing a different portion of the first item of recorded audio content with a portion of a third item of audio content spoken by a third voice; and replacing, in the modified item of audio content, the synchronized different portion of the first item of recorded audio content with the synchronized portion of the third item of audio content.

28. The computer-implemented method of claim 26 further comprising:
   presenting at least a portion of the modified item of audio content to a listener; and
   receiving a request for a further change to the modified item of audio content.

29. The computer-implemented method of claim 28, further comprising:
   in response to the request for the further change to the modified item of audio content, synchronizing a portion of a third item of audio content with the synchronized portion of the second item of recorded audio content; and
   replacing, in modified item of audio content, the synchronized portion of the second item of recorded audio content with the synchronized portion of the third item of audio content.

* * * * *